Patented Nov. 17, 1953

2,659,701

UNITED STATES PATENT OFFICE 2,659,701

SOLUBILIZED PLATINUM SULFIDE REFORMING CATALYST

Llewellyn Heard, Hammond, Ind., and Marvin J. Den Herder, Chicago, Ill., assignors to Standard Oil Company, Chicago, Ill., a corporation of Indiana No Drawing. Application June 29, 1951, Serial No. 234,427

12 Claims. (Cl. 252—439)

This invention relates to the preparation of catalysts and particularly to the preparation of hydrocarbon-conversion catalysts. In a specific embodiment, our invention relates to platinum-based catalysts for the continuous hydroforming of hydrocarbons.

Continuous hydroforming catalysts in general consist essentially of a platinum-group metal supported on alumina, optionally with a minor proportion of another constituent, such as a halogen, to act as a hydrocarbon-cracking adjuvant. A typical continuous hydroforming catalyst, as described in U. S. Patent 2,479,109, which issued August 16, 1949, to Vladimir Haensel, consists essentially of alumina combined with around 0.1 to 3 percent of fluorine by weight of the alumina on a dry basis and from about 0.01 to 1 percent by weight of platinum, preferably from about 0.1 to 1 percent. A simple method of preparing such a catalyst comprises commingling fluorine-treated alumina with an aqueous solution of chloroplatinic acid and drying the resulting mixture. This method is unsatisfactory because the platinum tends to concentrate at the surface of the catalyst particles during the drying operation, with the result that the finished catalyst is heterogeneous in composition. In a better method, the platinum solution is subjected to treatment with hydrogen sulfide, either before or after addition of the alumina, so that the platinum is converted into insoluble platinum sulfide, which cannot migrate during the drying operation. This method, however, leaves much to be desired: Aside from the fact that hydrogen sulfide is itself highly toxic and dangerous to work with, the resulting platinum sulfide suspension is quite unstable, and has been found to agglomerate and precipitate when allowed to stand for as little as 15 minutes. This behavior obviously tends to interfere with the achievement of uniform distribution of platinum in the catalyst. Furthermore, if any focal point exists in the sulfiding vessel, such as a trace of platinum or alumina, hydrogen sulfide cannot be introduced without immediate precipitation of platinum sulfide. In large-scale production of catalysts, this entails considerable expense owing to the difficulty of maintaining large reactors in a satisfactory state of cleanliness and owing to the cost of recovering and reconverting platinum from precipitated batches. Finally, the aqueous platinum solution to be sulfided with hydrogen sulfide can contain a maximum of only about 0.7 gram of platinum per liter; otherwise, precipitation immediately occurs on introduction of hydrogen sulfide. This is a serious drawback, since it prevents the sulfiding of concentrated solutions and discourages the use of platinum suspensions for impregnating solid (dry) supports.

We have now discovered a novel, simple, and economical means of preparing platinum sulfide solutions of lasting stability, from which can be prepared continuous hydroforming catalysts of high activity and selectivity and of long life without regeneration. Moreover, our improved method is suitable for sulfiding platinum solutions containing platinum in concentrations five times or more as great as in the prior-art processes. Additionally, our new process is capable of conveniently producing platinum catalysts substantially free from halogens or other contaminants.

One object of our invention is to effect an improvement in the conversion of hydrocarbons. Another object is to provide an improved catalyst for the conversion of hydrocarbons. A further object is to prepare a more stable and homogeneous platinum catalyst. An additional object is to prepare a platinum catalyst essentially free from chlorine. Still another object is to provide an improved method for the preparation of platinum-containing media for incorporation with supporting material to produce superior platinum catalysts. In summary, the broad object of our invention is to prepare an improved platinum catalyst of high activity in hydrogenation, dehydrogenation, and isomerization reactions, of low carbon-forming tendency, and having other characteristics rendering it especially adapted for use in the reforming of hydrocarbons. Other objects of our invention and its advantages over the prior art will be apparent from the following description and the appended claims.

In our new method, a platinum compound, such as an aqueous solution of chloroplatinic acid containing from about 0.1 to 10 grams of platinum per liter, preferably around 3.5 grams of platinum per liter, is contacted with an ammonium sulfide solubilizing agent. The platinum is converted thereby into a solubilized form of platinum sulfide in aqueous solution, which remains stable indefinitely. This solution, which may be a true solution or a collodial solution, is combined with alumina and optionally with a cracking catalytic adjuvant such as silica or a halogen, and the mixture is dried and calcined. A homogeneous catalyst is obtained thereby having high activity and selectivity and long life without regeneration in the continuous hydroforming of naphthas, gasolines, and other hydrocarbons.

The solubilizing agent employed in our invention is a sulfide or polysulfide of ammonium, a substituted ammonium compound, or the like. We may conveniently employ the so-called "yellow ammonium sulfide" of commerce which, according to Mellor ("Modern Inorganic Chemistry," New York, Longmans, Green and Company, Eighth Edition, 1933, p. 489) comprises $NH_4HS$, $(NH_4)_2S$, and $(NH_4)_2S_{(1-9)}$. We have also found that each of the components named by Mellor is individually suitable for use in our process. In addition, the analogous sulfide compounds of a wide variety of amines (that is, substituted ammonium compounds), preferably water-soluble amines, are suitable in our process. Among such amines are methylamine, dimethylamine, trimethylamine, tetramethylammonium, ethylamines, propylamines, butylamines, n-hexylamine, 1-methylheptylamine, cyclohexylamine, furfurylamine, benzylamine, aniline, xylidine, pyridine, benzyltrimethylammonium, and the like. Our solubilizing agent can be broadly defined as a sulfide compound of a nitrogen base.

In one embodiment of our invention, an aqueous solution of chloroplatinic acid containing 3.5 grams of platinum per liter is commingled at room temperature with an aqueous solution of ammonium sulfide containing sulfur ions in a molar ratio to the platinum of about 2:1. Hydrous alumina containing around 1.0 percent by weight fluorine based on dry $Al_2O_3$ is then commingled with a sufficient quantity of the resulting platinum sulfide solution to produce a final catalyst containing around 0.3 percent platinum by weight, dry $Al_2O_3$ basis, and the mixture is dried and calcined.

In a second highly advantageous embodiment of our invention, concentrated chloroplatinic acid solution (containing more than about 0.7 gram of platinum per liter, for example 10 grams of platinum per liter) is commingled with a solution of sodium sulfide or other soluble metallic sulfide. The resulting precipitate of platinum sulfide is removed from the reaction mixture by filtration or the like, and substantially all halogen is conveniently removed therefrom by washing with water. The purified platinum sulfide is brought into solution by mixing with an aqueous solution of ammonium sulfide or other solubilizing agent of our defined class. The resulting stabilized platinum sulfide solution is composited with alumina and the mixture is dried and calcined.

In another embodiment of our invention, an aqueous solution of chloroplatinic acid containing less than about one gram of platinum per liter, for example about 0.7 gram per liter, is treated with hydrogen sulfide, and the treated mixture is stabilized by commingling ammonium sulfide therewith. A stable solution of platinum sulfide is produced thereby. This solution is combined with alumina and a cracking adjuvant, and the mixture is dried and calcined.

In any of the foregoing embodiments, any soluble platinum compound can be used which is capable of being converted into a platinum sulfide by contact with sulfide or hydrosulfide ions. Among such compounds are platinum tetrachloride, chloroplatinic acid, analogues thereof with other halogens, and the like. The alumina base may be prepared by addition of an alkali to an aqueous solution of aluminum chloride, sulfate, or other salt, by acidification of sodium aluminate or other soluble aluminate, by reaction of amalgamated aluminum in the presence of a weak organic acid as a peptizing agent, as described by Heard in U. S. Reissue Patent 22,196, issued October 6, 1942, or by various other means described in the art. The cracking component of the catalyst, if employed, can be silica, fluorine, chlorine, or the like, but should not include materials, such as metals of the iron group, which are active coke and gas formers.

Our solubilizing reaction is very rapid and is ordinarily completed within a period of a few minutes. We prefer to carry out the reaction at ordinary temperatures, but somewhat lower and higher temperatures are equally satisfactory, i. e. from about 40 to 175° F. Sulfur should be employed in the active sulfur-ion form in at least equimolar proportion to the platinum, and the nitrogen base is preferably employed in at least equimolar ratio to the platinum, although satisfactorily stable solutions can be produced with smaller proportions of the nitrogen compound.

The catalyst is completed by conventional procedures. The complete catalytic mixture is preferably dried at least in part at a temperature between about 200 and 400° F. for a period between about 4 and 24 hours to a maximum water content of around 20 percent by weight. The resulting cake is then calcined at a temperature between about 800 and 1200° F. for around 2 to 8 hours or more. If desired, the catalytic mixture can be contacted with hydrogen or a hydrogen-containing gas at a temperature between about 300 and 600° F. for about 4 to 12 hours or more prior to the said calcining step, or the calcining step itself can be carried out in the presence of hydrogen or hydrogen-containing gas. As a further alternative, the effect of the calcining treatment can be achieved during the utilization of the catalyst at elevated temperature in the conversion of hydrocarbons.

The catalyst can be prepared in any desired mechanical form according to the specific process for which it is intended. Either before or after calcination it can be broken into lumps or granules, or it can be ground into a fine powder, suitable for use for example in the suspensoid or fluidized-solids processes. Alternatively, the catalyst can be formed into pills, pellets, or other suitable shapes, preferably prior to the calcination step: In this case, the partially dried catalytic mixture is ground to a powder, preferably small enough to pass through a 30-mesh screen, a suitable lubricant is added, such as stearic acid, rosin, hydrogenated coconut oil, graphite, or the like, and the mixture is shaped by extrusion, compression in a pilling machine, or otherwise according to methods well known in the art. Pills having dimensions ranging from about $\frac{1}{8}'' \times \frac{1}{8}''$ to $\frac{1}{2}'' \times \frac{1}{2}''$ are highly satisfactory for most purposes. The shaped masses can then be hydrogen-treated and/or calcined, as set forth above.

Our invention will be more fully understood from the following specific examples.

*Example I*

An aqueous chloroplatinic acid solution containing 0.7 gram of platinum per liter was treated with hydrogen sulfide for four minutes at room temperature. The resulting reddish-brown, transparent platinum sulfide sol was stable at room temperature for approximately 30 minutes, after which agglomeration and precipitation commenced.

A 20-milliliter portion of an aqueous chloroplatinic acid solution containing 0.7 gram of platinum per liter was treated with hydrogen sulfide for four minutes, and 2 milliliters of aqueous 23 percent ammonium sulfide solution were then commingled therewith. The resulting solution was stable on exposure to air for a period in excess of twenty-four hours.

A 20-milliliter portion of an aqueous chloroplatinic acid solution containing 0.7 gram of platinum per liter was commingled at room temperature with 2 milliliters of aqueous ammonium sulfide containing 230 grams of $(NH_4)_2S$ per liter. A stable solution of platinum sulfide was obtained which showed no tendency to precipitate during storage for thirty days.

In a series of similar tests, sols that were stable for more than 30 days were obtained when the quantity of ammonium sulfide solution employed was within the range of 2 to 6 milliliters per 20-milliliter portion of chloroplatinic acid solution. When the quantity of ammonium sulfide solution was reduced below 2 milliliters, the stability of the resulting solution was decreased, until at a level of 0.1 milliliter of ammonium sulfide solution it was not better than the sol prepared with hydrogen sulfide alone, as described above.

Aqueous ammonium sulfide was commingled with an aqueous chloroplatinic acid solution containing 3.5 grams of platinum per liter of solution. A stable platinum sulfide solution was obtained thereby.

Sulfur was dissolved in commercial ammonium sulfide solution to prepare ammonium polysulfide in substantial concentration. The resulting composition, when added to an aqueous chloroplatinic acid solution, produced a platinum sulfide solution which had not precipitated at the end of several hours.

An aqueous 14 percent ammonium hydroxide solution was partially neutralized with hydrogen sulfide, yielding a solution containing ammonium hydrosulfide. This solution, when added to an aqueous chloroplatinic acid solution, produced a platinum sulfide solution which was observed to be stable for several hours.

An aqueous solution of chloroplatinic acid was treated with hydrogen sulfide, and ammonium hydroxide was added to the resulting sol. Platinum sulfide was precipitated at once.

An aqueous solution of chloroplatinic acid was commingled with ammonium hydroxide, and the mixture was treated with hydrogen sulfide. Platinum sulfide precipitated at once.

Example II

A continuous hydroforming catalyst was prepared according to the following procedure: To 4,000 milliliters of an aqueous chloroplatinic acid solution containing 4.73 grams of platinum per liter were added 25 milliliters of yellow ammonium sulfide solution containing 23 percent by weight of $(NH_4)_2S$. The resulting sulfided platinum solution was slurried into a suspension of hydrous alumina containing 844 grams of $Al_2O_3$ in 8 liters of water. The composite was dried at 185° F. for 32 hours, heated at 350° F. for three hours, ground, pelleted, and calcined at 900° F. for three hours. The completed catalyst contained 0.6 percent platinum. When tested in the hydroforming of a Mid-Continent naphtha of 43.0 CFR-R octane number and boiling in the range of 154–371° F., at 750 pounds per square inch gage, a liquid hourly space velocity of 4, and a once-through hydrogen rate of 5,000 cubic feet per barrel of charging stock, the catalyst required a temperature of 900° F. to produce a 91.5 percent yield of 76 octane (CFR-R) $C_5$–400° F. gasoline.

Example III

Another continuous hydroforming catalyst was prepared according to the following procedure: An aqueous solution of chloroplatinic acid (5723 milliliters) containing 13.16 grams of platinum was commingled with 25 milliliters of ammonium sulfide containing 5.75 grams of $(NH_4)_2S$. The sulfided platinum solution was then slurried into 46,727 grams of Heard-type alumina hydrosol containing 46.75 grams of $Al_2O_3$ per liter. The hydrosol composite was poured to set and dehydrate in a draft oven at 185° F. for 24 hours, after which it was heated for three hours at 350° F., was ground and pelleted, and was calcined at 900° F. for three hours. The resulting catalyst contained 0.6 percent by weight of platinum on a dry basis. When the catalyst was tested in the hydroforming of a Mid-Continent naphtha boiling from 154 to 371° F. and having a 43.0 CFR-R octane number, the test being carried out at 250 pounds per square inch gage, a liquid hourly space velocity of 4.0, and a once-through hydrogen rate of 5,000 cubic feet per barrel of charging stock, a temperature of 955° F. was required to produce a 96 CFR-R octane $C_5$–400° F. gasoline. By extrapolation, this indicates that the catalyst would require a temperature of 870° F. to produce a 76 CFR-R octane $C_5$–400° F. gasoline.

Example IV

Hydrogen sulfide was passed at room temperature through an aqueous chloroplatinic acid solution containing 7 grams of platinum per liter. The resulting precipitate of platinum sulfide was filtered off and was washed with water until substantially free from chloride ions. The washed platinum sulfide was subsequently treated with an aqueous solution of ammonium sulfide, and a stable, transparent, dark brown platinum solution was obtained.

A portion of precipitated and washed platinum sulfide, prepared as described above, was treated with an aqueous solution of ammonium polysulfide, and a transparent solution was obtained, darker in color than the solution obtained by using ammonium sulfide.

The aforesaid solutions comprising complexes of platinum sulfide with ammonium sulfide and ammonium polysulfide are useful in preparing alumina-based hydroforming catalysts as described in Examples II and III, and the resulting catalysts have the special advantage of being substantially free from chloride ions.

Our improved catalysts are broadly useful in hydrocarbon-conversion reactions which are catalyzed by platinum. Specifically, our catalysts are useful for reforming, isomerization, hydrogenation, hydrocracking, dehydrogenation, oxidation, polymerization, condensation, and other reactions known in the art. The required processing conditions will vary somewhat, depending upon the specific reactions and the charging stocks involved, and may be determined from the teachings of the prior art. In general, our improved catalysts are suitable in the same applications and under substantially the same conditions as outlined in U. S. Patent 2,479,109, which issued to Vladimir Haensel on August 16, 1949.

When employed in the reforming or "hydroforming" of various hydrocarbon fractions, our catalysts simultaneously effect a group of reactions, including the production of $C_6$ naphthenes from other napthenes by isomerization, dehydrogenation of naphthenes to form aromatics, cyclization of paraffins to form aromatics, isomerization of straight-chain paraffins to form branched-chain paraffins, cracking of paraffins to carbon and to unsaturated fragments of lower molecular weight, hydrogenation of the carbon and of the unsaturated fragments, and various side reactions. All of these reactions tend to produce products containing motor-fuel fractions of improved antiknock rating.

In utilizing our new catalysts for the continuous reforming of hydrocarbons, a feed stock consisting essentially of a virgin naphtha, a cracked naphtha, or a mixture thereof, boiling within the range of about 70 to 500° F., and preferably within the range of about 180 to 375° F., is contacted in the vapor phase with one of the said catalysts at a temperature within the range of about 800 to 1050° F., the average temperature throughout the catalyst bed being maintained within the range of about 875 to 950° F., preferably around 900° F. The process is operated at a pressure within the range of 200 to 1000 pounds per square inch, preferably from about 500 to 800 pounds per square inch. Hydrogen is included within the reaction zone, ordinarily by recycle, in the range of about 2 to 8 moles of hydrogen per mole of feed, preferably between about 3 and 6 moles per mole. We prefer to adjust the composition of our catalyst and to adjust the operating conditions so that there is at least a small net production of hydrogen, the introduction of hydrogen from an outside source being thereby rendered unnecessary. This can conveniently be effected for a given catalyst composition by adjusting the proportion of naphthenes in the charging stock to produce at least enough hydrogen to saturate the materials produced by the paraffin-cracking reactions and to provide for the normal venting requirements. Alternatively, for a charging stock of a given composition, the desired hydrogen balance can be attained by restricting the cracking component of our catalyst (fluorine, silica, or the like) so that the paraffin-cracking reaction is overbalanced by the naphthene-dehydrogenation reaction. It has been found, for example, that for a given charging stock, hydrogen production and utilization are in balance if the fluorine content of our catalyst, expressed as percent by weight, is approximately 5 percent of the naphthene content of the charging stock, expressed as percent by volume; and the use of lower proportions of fluorine results in a net production of hydrogen.

Our new catalysts can be employed in any of the conventional types of equipment known to the art. We may, for example, employ the catalyst in the form of pills, pellets, granules, broken fragments, or various special shapes, disposed as a fixed bed within a reaction zone, and the charging stock may be passed therethrough in the liquid, vapor, or mixed phase, and in either upward or downward flow. Alternatively, we may prepare the catalyst in a suitable form for use in moving beds, in which the charging stock and catalyst are preferably passed in countercurrent flow; or in fluidized-solid processes, in which the charging stock is passed upward through a turbulent bed of finely divided catalyst; or in the suspensoid process, in which the catalyst is slurried in the charging stock and the resulting mixture is conveyed into the reaction zone. The reaction products from any of the foregoing processes are separated from the catalyst, vented to atmospheric pressure, and fractionated to recover the various components thereof. The hydrogen and unconverted materials are recycled as desired.

While we have described our invention in connection with certain specific embodiments thereof, it will be understood that we are not limited thereto. Our invention is broadly applicable within the scope of the disclosure thereof set forth hereinabove, and it is to be understood that any modifications or equivalents that would ordinarily occur to one skilled in the art are to be considered as lying within the scope of our invention.

In accordance with the foregoing description, we claim as our invention:

1. A method for preparing a hydrocarbon-conversion catalyst which comprises commingling a platinum compound with a solution of a sulfide of a nitrogen base, whereby a stable solution of platinum sulfide is obtained, commingling said stable solution of platinum sulfide with alumina, and drying and calcining the resulting catalytic mixture.

2. The method of claim 1 wherein said sulfide of a nitrogen base is ammonium sulfide.

3. The method of claim 1 wherein said sulfide of a nitrogen base is ammonium polysulfide.

4. The method of claim 1 wherein said nitrogen base is a water-soluble amine.

5. A method for preparing a hydrocarbon-reforming catalyst which comprises commingling a platinum compound with a solution of a sulfide of a nitrogen base, whereby a stable solution of platinum sulfide is obtained, commingling said stable solution of platinum sulfide with alumina and a mild cracking adjuvant, and drying and calcining the resulting catalytic mixture.

6. A method for preparing a hydrocarbon-reforming catalyst which comprises commingling an aqueous solution of chloroplatinic acid with an aqueous solution of an ammonium sulfide, whereby a stable colloidal suspension of platinum sulfide is obtained, commingling said stable colloidal suspension of platinum sulfide with halogen-containing alumina, and drying and calcining the resulting catalytic mixture.

7. A method for preparing a hydrocarbon-reforming catalyst which comprises combining a halogen with alumina in a proportion from about 0.1 to 8 percent by weight of said alumina on a dry basis, separately commingling an aqueous solution of a platinum compound with a solution of an ammonium sulfide, whereby a stable solution of platinum sulfide is obtained, commingling said stable solution of platinum sulfide with said halogen-containing alumina, and drying and calcining the resulting catalytic mixture.

8. A method for preparing a hydrocarbon-reforming catalyst which comprises combining fluorine with alumina in a proportion from about 0.1 to 3 percent by weight of said alumina on a dry basis, separately commingling an aqueous chloroplatinic acid solution with an aqueous solution of ammonium sulfide, whereby a stable solution of platinum sulfide is obtained, commingling with said fluorine-containing alumina a sufficient quantity of said stable solution of platinum sulfide to form a final catalyst containing from about 0.01 to 1 percent by weight of platinum, and drying and calcining the resulting catalytic mixture.

9. A method for preparing a hydrocarbon-reforming catalyst which comprises commingling platinum sulfide with an aqueous solution of an ammonium sulfide, whereby a stable solution of platinum sulfide is obtained, commingling said stable solution of platinum sulfide with alumina and a mild cracking adjuvant, and drying and calcining the resulting catalytic mixture.

10. A method for preparing a hydrocarbon-conversion catalyst which comprises precipitating platinum sulfide from a solution of a halogen-containing compound of platinum, washing said platinum sulfide substantially free from halogen, commingling the washed platinum sulfide with an aqueous solution of a sulfide of a nitrogen base, whereby a stable solution of platinum sulfide, substantially free from halogen, is obtained, commingling said solution of platinum sulfide with alumina, and drying and calcining the resulting catalytic mixture.

11. A method for preparing a hydrocarbon-conversion catalyst which comprises commingling a platinum compound with a solution of a sulfide of a nitrogen base in a sulfur ion-to-platinum ratio of at least about 1:1 and a basic nitrogen-to-platinum ratio of at least about 1:1, whereby a stable solution of platinum sulfide is obtained, commingling alumina with a sufficient quantity of said stable solution of platinum sulfide to form a final catalytic mixture containing between about 0.01 and 1 percent by weight of platinum, based on dry $Al_2O_3$, and drying and calcining the resulting mixture.

12. A method for preparing a hydrocarbon-conversion catalyst which comprises commingling an aqueous chloroplatinic acid solution with an approximately equimolar proportion of an aqueous ammonium sulfide solution, whereby a stable solution of platinum sulfide is obtained, commingling alumina with a sufficient quantity of said stable solution of platinum sulfide to form a final catalytic mixture containing between about 0.1 and 1 percent by weight of platinum, and drying and calcining the resulting catalytic mixture.

LLEWELLYN HEARD.
MARVIN J. DEN HERDER.

References Cited in the file of this patent

UNITED STATES PATENTS

| Number | Name | Date |
|---|---|---|
| 2,479,109 | Haensel | Aug. 16, 1949 |
| 2,566,521 | Haensel | Sept. 4, 1951 |
| 2,623,860 | Haensel | Dec. 30, 1952 |

OTHER REFERENCES

Mellor, "Comp. Treatise on Inorg. Chem.," pg. 398, vol. 16. Copy in Div. 59.